United States Patent Office 3,321,987
Patented May 30, 1967

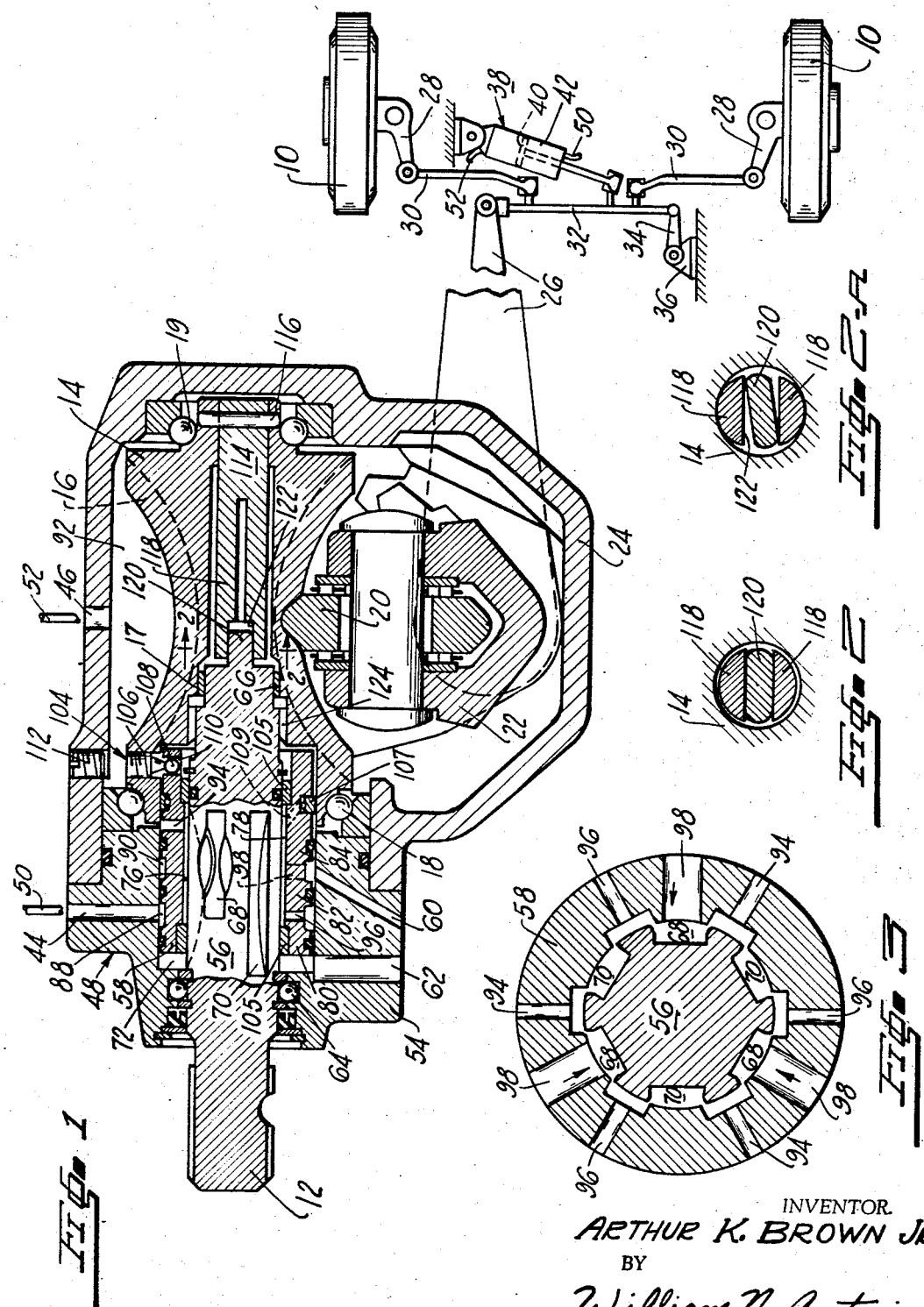

3,321,987
POWER STEERING MECHANISM
Arthur K. Brown, Jr., South Bend, Ind., assignor to The Bendix Corporation, South Bend, Ind., a corporation of Delaware
Filed Dec. 16, 1964, Ser. No. 418,626
8 Claims. (Cl. 74—388)

This invention relates to power steering and more particularly to a unique mechanical reaction arrangement for providing "feel" in connection with a power steering mechanism.

An object of this invention is to provide a mechanical reaction arrangement for use in connection with a power steering mechanism which can be used in place of conventional torsion bar arrangements.

Another object of this invention is to provide a mechanical reaction arrangement which is relatively inexpensive and easier to assemble.

More specifically, it is an object of this invention to provide a mechanical reaction arrangement wherein a bifurcated member, which in effect is a double cantilever, is utilized to provide centering and "feel" in a power steering mechanism.

The above and other objects and features of this invention will be apparent from the following description of the mechanism taken in connection with the accompanying drawing which forms a part of this specification and in which:

FIGURE 1 is a sectional view of a power steering unit, constructed in accordance with the present invention, which is shown in association with parts of a vehicle drawn schematically;

FIGURE 2 is a sectional view taken along line 2—2 of FIGURE 1;

FIGURE 2A is a sectional view, similar to that of FIGURE 2, showing the relative position of the parts during a turning maneuver; and FIGURE 3 is a composite sectional view which shows the power steering valve passages moved into the same plane for purposes of more clearly illustrating the flow paths within the valve.

Referring to FIGURE 1, it will be seen that reference numeral 10 designates the front wheels of a vehicle to be steered by rotation of a steering shaft (not shown) which is suitably connected to input shaft 12. Operatively connected to the input shaft 12 is an hourglass worm 14 having a groove-type cam track 16 formed thereon and a bore 17 located within and at one end thereof which extends substantially to the bottom of the cam track without interfering therewith, said worm being held against axial displacement by radial thrust bearings 18 and 19 located at each end of the worm. A roller sector gear 20 is arranged to engage the cam track 16 of the worm and is carried by one end of a sector shaft 22 which is suitably journaled in gear housing 24. A pitman arm 26 is connected to the other end of sector shaft 22 and to the spindle arms 28 of the wheels 10 through a steering linkage assembly which includes tie rods 30, a cross tie rod 32, and an idler arm 34, suitably pivoted at one end to the vehicle frame 36.

The hydraulic system of the power steering mechanism includes a fluid motor 38, which may be connected between the cross tie rod 32 and the vehicle frame 36, as shown in FIGURE 1. However, the fluid motor may be located at any other suitable position, e.g., integral with the steering gear housing. A piston 40 divides cylinder 42 into opposed chambers constantly communicating respectively with cylinder ports 44 and 46 of rotary valve 48, via conduits 50 and 52.

The main components of the rotary valve 48 are the valve housing 54, the rotor 56 which is formed on the input shaft 12, and the sleeve 58 which is located between the rotor and valve housing. Located in the housing 54 are inlet port 60, outlet port 62, and the two previously mentioned cylinder ports 44 and 46. It will be noted that the combination input shaft-valve rotor has one end thereof which rotates on roller bearing 64 which is located between the input shaft 12 and the valve housing 54 while the other end thereof extends into the bore 17 and rotates on a bronze bearing 66 located between the input shaft and the worm 14. The rotor 56, contains six axially extending equally spaced slots formed on the outer periphery thereof, three of which are pressure slots and are designated by the reference numeral 68 and the other three of which are return slots and are designated by the reference numeral 70. It will be noted that the return slots 70 are longer than the pressure slots 68 so that the return slots may communicate with a return chamber 72 located at one end of sleeve 58.

Located on the inner periphery of valve sleeve 58 are six axially extending equally spaced slots, three of which are designated by the reference numeral 76 and the other three of which are designated by the reference numeral 78. Formed on the outer periphery of valve sleeve 58 are three annular lands 80, 82 and 84 and two annular grooves 88 and 90. Since sleeve 58 extends into the bore 17, it is possible to eliminate the fourth annular land and third annular groove both of which are normally common to rotary valves of this general type, as typified by Davis Patent No. 1,947,973. In view of the arrangement shown, it is possible to communicate steering gear cavity 92 with sleeve slots 76 via radially extending passages 94 without the necessity for utilizing an annular groove on the valve sleeve, since radially extending passages 94 open directly into the steering gear cavity via bearings 18. On the other hand, radially extending passages 96 communicate sleeve slots 78 with annular groove 88. Radially extending passages 98 communicate rotor slots 68 with annular groove 99. Thus, it can be seen from the drawing, particularly FIGURE 3, that when the rotary valve 48, which is an open center valve, is in a neutral straight-ahead position, flow will occur from inlet port 60 to outlet port 62 via annular groove 90, radially extending sleeve passages 98, axially extending rotor slots 68, axially extending sleeve slots 76 and 78, axially extending rotor slots 70, and return chamber 72. Cylinder port 44 communicates with sleeve slots 76 via radial sleeve passages 96 and annular groove 88 whereas cylinder port 46 communicates with sleeve slots 76 via radial passages 94 and steering gear cavity 92.

Seals are located in annular lands 80, 82 and 84 to prevent leakage thereacross. These seals are glass filled Teflon endless sealing rings of rectangular section. Stop-off rings 105 seal off the axially extending sleeve slots 76 and 78 and also serve as bearings. In order to prevent possible vibrations between the valve sleeve 58 and worm 14, an annular Teflon shoe 107 is interposed therebetween and is pressurized by fluid communicated thereto from one of said axially extending pressure slots 68 via a passage 109. Such pressurization causes the Teflon shoes to expand radially.

An eccentric screw 104 is used to key the valve sleeve 58 directly to the worm. The eccentric screw is threaded into the worm at one end 106 and has the other spherical head end 108 extending into and in contact with the wall of a close fitting cylindrical hole 110, said hole being drilled into the end of valve sleeve 58. After removing the threaded plug 112 the eccentric screw 104 may be rotated by means of an Allen wrench so that the valve may be "trimmed." In other words, turning of the eccentric screw causes rotation of the sleeve with respect to the worm and the rotor.

The three equally spaced flow paths previously described give balanced forces within the valve due to fluid flow, thereby eliminating any stickiness due to hydraulic unbalance. Upon rotation of the steering wheel, the valve rotor 56 is rotated relative to the valve sleeve 58. This movement is in proportion to input torque. As can more clearly be seen by reference to FIGURE 3, relative rotation between valve rotor 56 and valve sleeve 58 will cause one of the cylinder ports 44, 46 to communicate with the inlet port 60 and the other cylinder port to communicate with the outlet port 62. This will create a differential pressure across piston 40 and will result in power assisted steering.

Located within the bore of the worm 14 is a double cantilever spring member 114 which is rigidly connected to the worm 14 through means of a pin 116. At the end opposite the pinned end, the spring member 114 has a resilient bifurcated end portion 118 for opposing rotation of the input member 12. Such opposition is accomplished through the mechanical interconnection between the input member and the spring member. More specifically, the interconnection is a tongue and groove arangement wherein a tongue 120 extends from the input member 12 into the groove or slot 112 located between the bifurcations 118 of the spring member. In this type of arrangement, mechanical "feel" is provided by causing the bifurcations to be spread apart upon rotation of the input member in either direction. The relative positions of the tongue 120 and bifurcations 118 are shown in FIGURES 2 and 2A, wherein FIGURE 2 shows the straight ahead center position and FIGURE 2A shows a turning position. It will be understood by those skilled in the art that mechanical "feel" can also be accomplished by reversing the position of the bifurcations and tongue, namely by forming the bifurcations on the end of the input member 12 and forming a tongue on the end of member 114.

A mechanical drive through spline type connection 124 is provided between the input rotors 12, 56 and the worm 14, which will result in a direct mechanical drive between the input shaft and the worm in the event of power failure. At all other times, this connection will permit limited relative rotary motion between the input shaft and the worm. If, however, power failure occurs, the driver will continue to spread the bifurcations 118 apart until contact is made between the splines. Input torque is then transmitted exactly as in a manual steering system.

The several practical advantages which flow from my novel inventive combination are believed to be obvious from the above description, and other advantages may suggest themselves to those who are familiar with the art to which the invention relates.

Furthermore, although this invention has been described in connection with a certain specific embodiment, it will be obvious to those skilled in the art that various changes may be made in the form, structure, and arrangement of parts without departing from the spirit of the invention. Accordingly, applicant does not desire to be limited to the specific embodiment disclosed herein primarily for the purposes of illustration, but instead desires protection falling within the scope of the appanded claims.

Having thus described the various features of the invention, what I claim as new and desire to secure by Letters Patent is:

1. In a power steering mechanism including an input member, an output member, and a fluid motor operatively connected to said output member, the combination within a housing of a worm having a bore therein and groove means formed thereon, follower means operatively connected to said output member and engaging said groove means, a pair of relatively rotatable telescoped tubular elements through which fluid flow to and from said motor is controlled, one of which is a part of said input member and the other of which is connected to said worm, a spring member located within said bore and rigidly connected to said worm, said spring member having a resilient bifurcated end portion for opposing rotation of said input member, and a tongue formed on the end of said input member and located between said bifurcations for causing said bifurcations to be spread apart upon rotation of said input member.

2. In a power steering mechanism including an input member, an output member, and a fluid motor operatively connected to said output member, the combination within a housing of a worm having a bore therein and groove means formed thereon, follower means operatively connected to said output member and engaging said groove means, a pair of relatively rotatable telescoped tubular elements through which fluid flow to and from said motor is controlled, one of which is operatively connected to said input member and the other of which is operatively connected to said worm, a third member coaxially aligned with said input member and located in said bore, said third member being rigidly connected to said worm, a resilient bifurcated end portion operatively connected to one of said coaxially aligned members for opposing rotation of said input member, and a tongue operatively connected to the other of said coaxially aligned members and located between said bifurcations for causing said bifurcations to be spread apart upon rotation of said input member.

3. In a power steering mechanism including an input member, an output mmeber, and a fluid motor operatively connected to said output member, the combination within a housing of a worm having groove means formed thereon, follower means operatively connected to said output member and engaging said groove means, valve means operatively connected to said input member for controlling flow to and from said motor, a spring member rigidly connected to said worm, said spring member having a resilient bifurcated end portion for opposing rotation of said input mmeber, and a tongue formed on the end of said input member and located between said bifurcations for causing said bifurcations to be spread apart upon rotation of said input member.

4. In a power steering mechanism including an input member, an output member, and a fluid motor operatively connected to said output member, the combination with a housing of a worm having groove means formed thereon, follower means operatively connected to said output member and engaging said groove means, valve means operatively connected to said input member for controlling flow to and from said motor, a third member coaxially aligned with said input member and rigidly connected to said worm, a resilient bifurcated end portion operatively connected to one of said coaxially aligned members for opposing rotation of said input member, and a tongue operatively connected to the other of said coaxially aligned members and located between said bifurcations for causing said bifurcations to be spread apart upon rotation of said input member.

5. In a fluid operated servo device including an input member, an output member, a fluid motor operatively connected to said output member, and valve means for controlling the operation of said fluid motor, spring means for opposing rotation of said input member, said spring means comprising a member rigidly connected to said output member and having a resilient bifurcated end portion, and means operatively connected to said input member and located between said bifurcations for causing said bifurcations to be spread apart upon rotation of said input member.

6. In a servo mechanism having driven means, a motor drivingly connected to said driven means, and means for controlling operation of said motor, an input member, an output member, and spring means for opposing rotation of said input member, said spring means comprising a member rigidly connected to said output member and having a resilient bifurcated end portion, and means operatively connected to said input member and located between said bifurcation for causing said bifurcations to be spread apart upon rotation of said input member.

7. In a servo mechanism having driven means, a motor drivingly connected to said driven means, and means for controlling operation of said motor, an input member, an output member, means operatively connected to one of said members and having a resilient bifurcated end portion for opposing rotation of said input member and means operatively connected to the other of said members and located between said bifurcations for causing said bifurcations to be spread apart upon rotation of said input member.

8. In a mechanism having first and second relatively rotatable members, spring means for opposing relative rotation between said members, said spring means comprising means operatively connected to one of said members and having a resilient bifurcated end portion, and means operatively connected to the other of said members and located between said bifurcations for causing said bifurcations to be spread apart upon rotation of said input member.

References Cited

UNITED STATES PATENTS

| | | | |
|---|---|---|---|
| 2,773,396 | 12/1956 | Haynes et al. | 74—388 |
| 2,930,359 | 3/1960 | MacDuff | 91—368 |
| 2,964,017 | 12/1960 | Hruska | 91—368 |
| 3,162,263 | 12/1964 | Brown | 74—388 X |
| 3,235,953 | 2/1966 | Adams | 74—388 X |

FOREIGN PATENTS 747,135  3/1956  Great Britain.

FRED C. MATTERN, Jr., *Primary Examiner.*

DAVID J. WILLIAMOWSKY, *Examiner.*

C. J. HUSAR, *Assistant Examiner.*